United States Patent
Braat et al.

(10) Patent No.: US 6,306,978 B1
(45) Date of Patent: Oct. 23, 2001

(54) CAPPING OF POLYPHENYLENE ETHER RESIN

(75) Inventors: Adrianus J. F. M. Braat, Roosendaal; Adrie Landa; Juraj Liska, both of Bergen op Zoom, all of (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/245,255

(22) Filed: Feb. 5, 1999

(51) Int. Cl.[7] .............................. C08G 65/48; C08G 65/38
(52) U.S. Cl. .................................................. 525/397
(58) Field of Search ................................................ 525/397

(56) References Cited

U.S. PATENT DOCUMENTS

| | | |
|---|---|---|
| 3,306,874 | 2/1967 | Hay . |
| 3,306,875 | 2/1967 | Hay . |
| 3,383,435 | 5/1968 | Cizek . |
| 3,652,710 * | 3/1972 | Holub . |
| 3,914,266 | 10/1975 | Hay . |
| 4,028,341 | 6/1977 | Hay . |
| 4,097,550 | 6/1978 | Haaf et al. . |
| 4,101,503 | 7/1978 | Cooper et al. . |
| 4,101,504 | 7/1978 | Cooper et al. . |
| 4,101,505 | 7/1978 | Cooper et al. . |
| 4,113,800 | 9/1978 | Lee, Jr. . |
| 4,128,602 | 12/1978 | Katchman et al. . |
| 4,139,574 | 2/1979 | Cooper et al. . |
| 4,154,712 | 5/1979 | Lee, Jr. . |
| 4,391,950 * | 7/1983 | Cooper . |
| 4,808,672 * | 2/1989 | Hathaway . |
| 5,043,421 * | 8/1991 | Golba . |
| 5,213,886 * | 5/1993 | Chao . |
| 5,834,565 * | 11/1998 | Tracy . |

FOREIGN PATENT DOCUMENTS

| | | |
|---|---|---|
| 272439 * | 6/1988 | (EP) . |
| 0 301 233 A2 | 2/1989 | (EP) . |
| 0 301 233 A3 | 2/1989 | (EP) . |
| 0 501 155 A2 | 9/1992 | (EP) . |
| 0 501 155 A3 | 9/1992 | (EP) . |
| 0 522 767 A2 | 1/1993 | (EP) . |
| 0 534 543 A1 | 3/1993 | (EP) . |
| 0 639 603 A1 | 7/1993 | (EP) . |
| 0 592 144 A1 | 4/1994 | (EP) . |
| 592144 * | 4/1994 | (EP) . |

OTHER PUBLICATIONS

Baker, et al. "Eight–and Higher–membered Ring Compounds. Part II. Di–, Tri, Tetra–, and Hexa–salicylides" *J. Chem. Soc.* pp. 201–208 (1951).

Dean, et al. "Synthesis of Cis–Disalicylide and of Flavones Containing a Chromeno–[4,3–b]chromen Nucleus" *J. Chem. Soc.* pp. 2007–2010 (1972).

Saegusa, et al. "Polymerization of Anhydro–O–carboxysalicylic Acid" *Polymer Bulletin 1,* pp. 341–345 (1979).

* cited by examiner

*Primary Examiner*—David J. Buttner

(57) ABSTRACT

The invention relates to methods of capping poly(phenylene ether) resin having an intrinsic viscosity between 0.05 and 0.35 dl/g. More particularly, the methods comprise capping a poly(phenylene ether) resin having an intrinsic viscosity between 0.05 and 0.35 dl/g in a solvent to produce a capped poly(phenylene ether) resin having an intrinsic viscosity between 0.05 and 0.35 dl/g and isolating the capped poly (phenylene ether) resin by removal of the solvent, preferably in a process other than precipitation. The invention also relates to the capped poly(phenylene ether) resin having an intrinsic viscosity between 0.05 and 0.35 dl/g.

17 Claims, No Drawings

CAPPING OF POLYPHENYLENE ETHER RESIN

CROSS-REFERENCE TO RELATED APPLICATIONS

Not Applicable

FEDERALLY SPONSORED RESEARCH

Not Applicable

BACKGROUND OF THE INVENTION

1. Field of the Invention

The invention relates to methods of capping poly (phenylene ether) resin, and more particularly relates to methods of capping poly(phenylene ether) resin having an intrinsic viscosity between 0.05 and 0.35 dl/g, preferably between about 0.09 and 0.15 dl/g.

2. Brief Description of the Related Art

Poly(phenylene ether) resins (referred to hereafter as "PPE") are commercially attractive materials because of their unique combination of physical, chemical, and electrical properties. Commercially, most PPE are sold as blends with predominantly high impact polystyrene resins. PPE are miscible with polystyrene resins in all proportions and because of the very high glass transition temperatures of PPE, the blends of PPE with polystyrene resins possess higher heat resistance than that of the polystyrene resins alone. Examples of such blends can be found in U.S. Pat. Nos. 3,383,435; 4,097,550; 4,113,800; 4,101,503, 4,101,504; 4,101,505; 4,128,602; 4,139,574; and 4,154,712 among others.

Many commercial poly(phenylene ether) resins posses end groups having an aromatic hydroxyl moiety, generally an alkyl substituted phenol residue. These residues are believed to act as radical scavengers and consequently limit the utility of poly(phenylene ether) resins in applications involving desirable radical reactions. One example of a desirable application is the polymerization of styrene monomer, either alone or with comonomers, in the presence of poly(phenylene ether) resin. Similarly, poly(phenylene ether) resins become dark and embrittled in the presence of oxygen and high temperatures, presumably due to oxidation of these same hydroxyl groups. Capping the hydroxyl moieties present in PPE affords a solution to many of these problems. Moreover, capped PPE would also have utility in many PPE blends such as, for example, blends with other thermoplastic polymers as well as thermoset resins including unsaturated polyurethane resins, allylics, bismaleimides, and the like.

U.S. Pat. No. 4,760,118 describes a method to cap poly (phenylene ether) resins in a melt (i.e. solventless) process. The method described in the aforementioned patent was exemplified using a poly(phenylene ether) resin having an intrinsic viscosity of about 0.48 dl/g and afforded solutions to issues for capping relatively high molecular weight poly (phenylene ether) resin.

Recently, interest has increased in poly(phenylene ether) resins having an intrinsic viscosity between 0.05 and 0.35 dl/g due, in part, to their increased processability and miscibility as compared to commercially available resins having intrinsic viscosities between 0.40 and 0.49 dl/g. With the reduced intrinsic viscosity the number of endgroups increases and aforementioned problems become accentuated.

Capping poly(phenylene ether) resin relatively low molecular weight poly(phenylene ether) resin, e.g., having an intrinsic viscosity between 0.05 and 0.35 dl/g, presents issues that were not previously recognized. For example, relatively low molecular weight poly(phenylene ether) resin has a significantly higher proportion of hydroxyl moieties for capping. Similarly, relatively low molecular weight poly(phenylene ether) resin can not be efficiently isolated after polymerization using conventional solvent precipitation techniques due to the extremely small particle size generated with conventional techniques. The low melt strength of relatively low molecular weight poly(phenylene ether) resin also presents special issues, especially with stranding and chopping the extrudate.

It is therefore apparent that there continues to be a need for improved methods for capping relatively low molecular weight poly(phenylene ether) resin.

SUMMARY OF THE INVENTION

The invention relates to methods of capping poly (phenylene ether) resin having an intrinsic viscosity between 0.05 and 0.35 dl/g, preferably between about 0.09 and 0.15 dl/g. More particularly, the methods comprise capping a poly(phenylene ether) resin having an intrinsic viscosity between 0.05 and 0.35 dl/g, preferably between about 0.09 and 0.15 dl/g, in a solvent to produce a capped poly (phenylene ether) resin having an intrinsic viscosity between 0.05 and 0.35 dl/g,, preferably between about 0.09 and 0.15 dl/g, and isolating the capped poly(phenylene ether) resin by removal of the solvent, preferably in a process other than precipitation. The invention also relates to the capped poly (phenylene ether) resin having an intrinsic viscosity between 0.05 and 0.35 dl/g, preferably between about 0.09 and 0.15 dl/g. These and other embodiments of the invention will become apparent as described herein.

DESCRIPTION OF THE DRAWINGS

Not applicable

DETAILED DESCRIPTION OF THE INVENTION

Poly(phenylene ether) resins, hereinafter referred to as "PPE" are known polymers comprising a plurality of structural units of the formula:

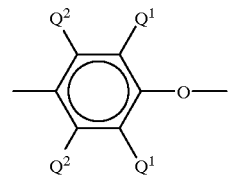

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are known and included in the present invention. The preferred homopolymers are those containing 2,6-dimethyl-1,4-phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains albeit to produce a higher molecular weight polymer.

It will be apparent to those skilled in the art from the foregoing that the PE contemplated for use in the present invention include all those presently known, irrespective of variations in structural units or ancillary chemical features.

The PPE generally have an intrinsic viscosity often between about 0.05-35 dl./g., preferably in the range of about 0.07-0.25 dl./g., and most referably in the range of about 0.09-0.15 dl./g., all as measured in hloroform at 25° C. It is also possible to utilize a higher intrinsic viscosity PPE outside these ranges in combination with a lower intrinsic viscosity PPE within these ranges. Determining an exact intrinsic viscosity to be used will depend somewhat on the ultimate physical properties that are desired.

PPE are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4phenylene ether), and 2,3,6-trimethylphenol (wherein each $Q^1$ and one $Q^2$ is methyl and the other $Q^2$ is hydrogen).

A variety of catalyst systems are known for the preparation of PPE by oxidative coupling. For the most part, they contain at least one heavy metal compound such as a copper, manganese or cobalt compound, usually in combination with various other materials.

A first class of operative catalyst systems consists of those containing a copper compound. Such catalysts are disclosed, for example, in U.S. Pat. Nos. 3,306,874, 3,306,875, 3,914, 266 and 4,028,341. They are usually combinations of cuprous or cupric ions, halide (i.e. chloride, bromide, or iodide) ions and at least one amine.

Catalyst systems containing manganese compounds are also known. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, omega-hydroxyoximes (monomeric and polymeric), o-hydroxyaryl oximes and beta-diketones. Also useful are cobalt-containing catalyst systems. Suitable manganese and cobalt-containing catalyst systems for polyphenylene ether preparation are known in the art by reason of disclosure in numerous patents and publications.

In one of its aspects, the invention is a method for capping PPE having an about 0.05-0.35 dl./g., preferably in the range of about 0.07-0.25 dl./ g., and most preferably in the range of about 0.09-0.15 dl./g., all as measured in chloroform at 25° C., which comprises reacting said PPE in solution with at least one ester of salicylic acid or anthranilic acid or a substituted derivative thereof. Another aspect is compositions prepared by said method.

For the most part, it is desirable for all hydroxy end groups on the PPE to be capped by the method of this invention. However, the invention includes compositions which contain a proportion of uncapped PPE, that is, PPE containing terminal hydroxy groups.

To produce the capped PPE of this invention, the PPE is reacted in the melt with at least one ester of salicylic acid (preferably) or anthranilic acid or a substituted derivative thereof. As used herein, the term "ester of salicylic acid" includes compounds in which the carboxy group, the hydroxy group or both have been esterified.

Other than as defined above, the precise molecular structure of the ester is not critical. Various substituents may be present on the salicylate ring, including, for example, alkyl, aryl, alkoxy, acyl, nitro, carbalkoxy and nitro, although unsubstituted compounds are preferred.

Particularly preferred are salicylic acid esters, including simple esters of the formula

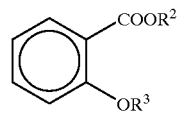

wherein each $R^3$ is independently hydrogen or an aliphatic, alicyclic or aromatic radical, preferably a hydrocarbon radical, at least one $R^3$ being other than hydrogen; silyl esters of the formula

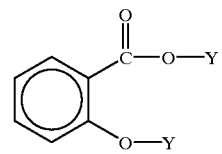

wherein each Y is hydrogen or $Si(R^4)_3$, at least one Y being $Si(R^4)_3$, and each $R^4$ is independently a $C_{1-4}$ alkyl radical, all $R^4$ values preferably being methyl; salicylic carbonate (benzo-1,3 dioxin-2,4-dione), having the formula

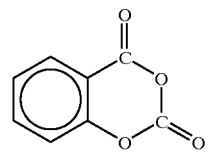

cyclic oligomeric esters (salicylides) of the formula

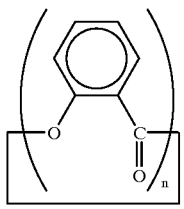

wherein n is a small integer and especially 2 or 3; and linear polysalicylates of the formula

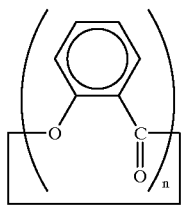

wherein n is at least 2.

The capping agents which are generally found to give the best yields of the capped polyphenylene ethers of this invention are aryl salicylates such as phenyl salicylate, aspirin (i.e., acetylsalicylic acid), salicylic carbonate and polysalicylates, including both linear polysalicylates and cyclic compounds such as disalicylide and trisalicylide. Such compounds as phenyl salicylate and aspirin react to form acidic by-products (phenol and acetic acid), which may be undesirable. Therefore, the most preferred capping agents are salicylic carbonate and the polysalicylates, especially linear polysalicylates.

Of the capping agents which may be used according to the invention, such compounds as phenyl salicylate, aspirin and isatoic anhydride are commercially available. Salicylic carbonate is a known compound which may be prepared, for example, by the reaction of salicylic acid with phosgene. Disalicylide and trisalicylide are also known, as is their preparation by pyrolysis of aspirin; Baker et al., J. Chem. Soc., 1951, 201.

Linear polysalicylates may be prepared by anionic polymerization of salicylic carbonate; Saegusa et al., Polym. Bull., 1,341 (1979). They have also been found to be the product (rather than the reported disalicylide) of the treatment of salicylic carbonate with a catalytic amount of triethylamine; Dean et al., J. Chem. Soc., Perkin I, 1972, 2007. Linear polysalicylates are additionally obtainable by reacting salicylic acid with acetic anhydride or thionyl chloride, or by pyrolysis of aspirin at somewhat lower temperatures than those employed by Baker et al.; these methods are disclosed and claimed in copending, commonly owned application Ser. No. 151,844, filed Feb. 3, 1988. Finally, the reaction of salicylic acid with phosgene in the presence of a tertiary amine such as triethylamine affords linear polysalicylates in high yield.

According to the invention, the PPE is heated in solution with the capping agent. Typical reaction temperatures are in the range of about 160°- 300° C. Aromatic solvents such as benzene, toluene, xylene and o-dichlorobenzene are especially preferred, although tetrachloromethane, trichloromethane, dichloromethane, 1,2-dichloroethane and trichloroethylene may also be used. The capping reaction can be conveniently conducted in a vessel capable of intimately mixing the PPE solution, preferably under pressure to avoid loss of the solvent. One useful vessel and process involves feeding the capping agent into a devolatilization piece of equipment like an devolatilizing extruder. Alternatively, the capping agent can be mixed without a solvent in a melt, like e.g., in a conventional extruder.

The proportion of capping agent used should generally be sufficient to react with substantially all hydroxy end groups, including any aminoalkyl end groups and 4-hydroxybiphenyl end groups that may be present in addition to any conventional 2,6-dialkylphenol end groups as known in the art to be present on PPE. The latter include any groups formed during the capping reaction by decomposition of capped and uncapped aminoalkyl end groups.

The molar proportion of capping agent will to some extent depend on the molecular weight and level of hydroxyl end groups in the PPE, as well as other hydroxy-substituted "tail" end groups resulting from equilibration with diphenoquinone. About 1–10 molar equivalents, most often about 2–4 molar equivalents, and preferably about 2.5–3.5 molar equivalents of capping agent, based on PPE hydroxyl number, is usually adequate. It is unexpected that molar amounts as low as about 2.5–3.5 based upon the PPE hydroxyl number would be sufficient to achieve capping levels in excess of 90% based upon the teachings of the prior art wherein molar amount of 4.5 or more were necessary to achieve similar high capping levels. Minimizing the amount of excess capping agent is extremely desirable from both cost standpoint and overall final purity viewpoints.

It is also within the scope of the invention to include at least one polystyrene in the composition. The term "polystyrene" as used herein includes polymers prepared by methods known in the art including bulk, suspension and emulsion polymerization, which contain at least 25% by weight of structural units derived from a monomer of the formula

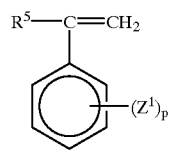

wherein $R^5$ is hydrogen, lower alkyl or halogen; $Z^1$ is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, alpha-methylstyrene, ethylvinylbenzene, divinylbenzene and maleic anhydride, and rubber-modified polystyrenes comprising blends and grafts, wherein the rubber is a polybutadiene or a rubbery copolymer of about 98–70% styrene and about 2-30% diene monomer. Polystyrenes are known to be miscible with PPE in all proportions, and any such blend may contain polystyrene in amounts of about 5–95% and most often about 25–75%, based on total resins.

In one embodiment, the compositions of this invention have been shown by infrared and carbon-13 nuclear magnetic resonance spectroscopy to contain end groups with salicylate ester moieties. Accordingly, another aspect of the invention is compositions comprising capped PPE which comprise polymer molecules having end groups of at least one of the formulas

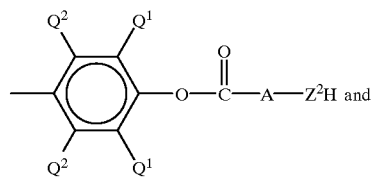

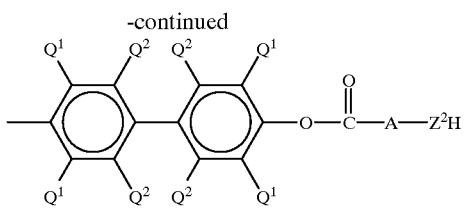

wherein A is an unsubstituted or substituted o-phenylene radical, $Z^2$ is O or NH and $Q^1$ and $Q^2$ are as previously defined. While the invention is not dependent on theory, it is believed that the capping agent is converted, under the conditions employed, to a ketene of the formula

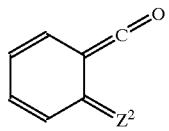

which then reacts with the hydroxy group to form an end group of one of the aforementioned formulas.

The capped PPE may be isolated in a variety of manners, e.g., by non-solvent precipitation followed by collection of the capped PPE, through direct devolatilization of the solvent, by chipping, or spray drying. In a preferred embodiment, the capped PPE is isolated by passing the reaction mixture through a devolatilization extruder capable of reducing the solvent level to less than about 2000 ppm, preferably less than about 1000 ppm. When a devolatilization extruder is utilized, it is often preferred to concentrate the PPE solution somewhat, typically to greater than about 50% solids, preferably greater than about 60% solids, before feeding the PPE solution to the extruder.

When using a devolatilization extruder for the total isolation of the capped PPE, it was found that traditional underwater or water spray cooling of strands of extrudate followed by chopping the extrudate into pellets gave unacceptable results presumably due to the low melt strength and inherent brittle nature of low molecular weight PPE. It was found that special pelletization techniques can overcome these difficulties. Useful techniques include die-face pelletization, including underwater pelletization and flaking, declining angle strand pelletization using water spraying, and vibration drop pelletization with underwater pelletization especially suitable.

The capped PPE of this invention are in many respects superior to uncapped PPE. For example, they are much less susceptible to oxidative degradation at high temperatures. This is demonstrated by a dramatic increase in time to embrittlement upon heat aging in air, and also by a decrease in oxygen uptake under high-temperature conditions. For the most part, tensile properties are not materially affected by capping. Additionally, the capped PPE reduces to a large part the radical scavenging the capability of the PPE. Thus, the capped PPE are useful in process that involve radical initiation and/or reactions, e.g., styrene polymerization processes as well as unsaturated polyester, allylic, and bismaleimide thermosetting resins.

Depending on the capping agent used, the glass transition and heat distortion temperatures of the capped polymers may be lower than those of the corresponding uncapped PPE. For example, linear polysalicylates are found to cause a greater decrease in said temperatures than salicylic carbonate. This phenomenon is apparently the result of various by-products which plasticize the polyphenylene ether. The plasticization effect may be decreased or eliminated by dissolving and reprecipitating the polymer after capping, thus removing the plasticizing materials.

The invention is illustrated by the following examples.

All patents cited herein are hereby incorporated by reference.

EXAMPLES

The following illustrative examples demonstrate various embodiments of the present invention. However, they are not intended to limit the invention in any manner.

In the examples of Table 1, polysalicylate (PSAL) was added in varying amounts to a PPE having an intrinsic viscosity of 0.12 dl/g and an hydroxyl number of 367 μmol/g dissolved in toluene and heated at 240° C. After 30 minutes an analytical sample was removed. After an additional heat treatment, simulating an extrusion step, a second analysis was performed. The conversion data is provided below.

TABLE 1

| PSAL (weight % based on PPE) | Conversion % (30 min.) | Conversion % after additional heat treatment |
|---|---|---|
| 24.5 | 100 | 100 |
| 15.4 | 100 | 100 |
| 12.5 | 95 | 100 |
| 8.4 | 72 | 86 |
| 6.3 | 50 | — |

As demonstrated by these examples, very high capping conversions can be achieved within short reaction times and at low temperatures. It was unexpected that complete capping conversion could be achieved with 12.5 weight percent polysalicylate as based on the teaching of the prior art, it was expected to require at least 4.5 times higher loading to achieve complete capping.

Capped PPE having an intrinsic viscosity between 0.05 and 0.35 dl/g can also be achieved in a melt process, e.g., in an extruder with high conversion rates even at reduced loadings of capping agent as would be expected from the prior art. Table 2 provides a comparision between a PPE having an intrinsic viscosity of 0.40 dl/g and an hydroxyl endgroup number of 82 μmol/g to a PPE having an intrinsic viscosity of 0.12 dl/g and an hydroxyl endgroup number of 367 μmol/g.

TABLE 2

| PPE I.V. | PSAL (weight % based on PPE) | Conversion % |
|---|---|---|
| 0.40 (82 μmol/g OH) | 4.0 | >93 |
| 0.12 (367 μmol/g OH) | 4.0 | 47 |
| 0.12 | 8.0 | 91 |
| 0.12 | 12.0 | 100 |

As seen by these data, one would expect at least a 4.5 times higher loading of polysalicylate to be required due to the proportionally higher number of hydroxyl groups to achieve complete conversion. However, it was unexpectedly found that PPE having an intrinsic viscosity of between about 0.05–0.35 dl./g., preferably in the range of about 0.07–0.25 dl./g., and most preferably in the range of about 0.10–0.15 dl./g. can achieve complete capping with significantly lower amounts of capping agent.

What is claimed:

1. A method to prepare a capped polyphenylene ether resin comprising capping a poly(phenylene ether) resin having an intrinsic viscosity between 0.05 and 0.35 dl/g with a capping agent in a solvent, wherein the capping agent is selected from at least one ester of salicylic acid or anthranilic acid or a substituted derivative of at least one of the foregoing, to produce a capped poly(phenylene ether) resin having an intrinsic viscosity between 0.07 and 0.24 dl/g and isolating the capped poly(phenylene ether) resin.

2. The method of claim 1 wherein the capping is done at a temperature between about 160° to about 300° C.

3. The method of claim 1 wherein the capped poly(phenylene ether) resin has an intrinsic viscosity between 0.10 and 0.15 dl/g.

4. The capped polyphenylene ether resin of claim 3.

5. The method of claim 1 wherein the capping agent comprises a cyclic polysalicylate of the formula

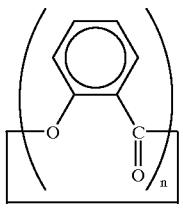

wherein n is at least 2.

6. The method of claim 1 wherein the capping agent is used in molar ratio of capping agent to polyphenylene ether resin hydroxyl of between about 1:1 and about 10:1.

7. The method of claim 1 wherein the capping agent is used in molar ratio of capping agent to polyphenylene ether resin hydroxyl of between about 2:1 and about 4:1.

8. The method of claim 1 wherein the capping agent is used in molar ratio of capping agent to polyphenylene ether resin hydroxyl of between about 2.5:1 and about 3.5:1.

9. The method of claim 1 wherein the solvent is selected from the group consisting of benzene, toluene, xylene, o-dichlorobenzene, tetrachloromethane, trichloromethane, dichloromethane, 1,2-dichloroethane, and trichloroethylene.

10. The method of claim 1 wherein the capped polyphenylene ether resin is isolated by devolatilization of the solvent.

11. The method of claim 1 wherein the capped polyphenylene ether resin is isolated by devolatilization of the solvent wherein the devolatilization is done at least partly in an extruder.

12. The method of claim 1 wherein the capped polyphenylene ether resin is isolated by spray drying.

13. The method of claim 1 wherein the capped polyphenylene ether resin is isolated by precipitation followed by collection.

14. The method of claim 1 wherein the capping is at least partly done during a devolatilization step to remove the solvent.

15. The method of claim 14 wherein the devolatilization step is at least partly accomplished with a devolatilizing extruder.

16. The method of claim 1 wherein at least a portion of the capping agent is added during a devolatilization step to remove the solvent.

17. The method of claim 16 wherein the devolatilization step is at least partly accomplished with a devolatilizing extruder.

* * * * *